з,481,231
Patented Dec. 2, 1969

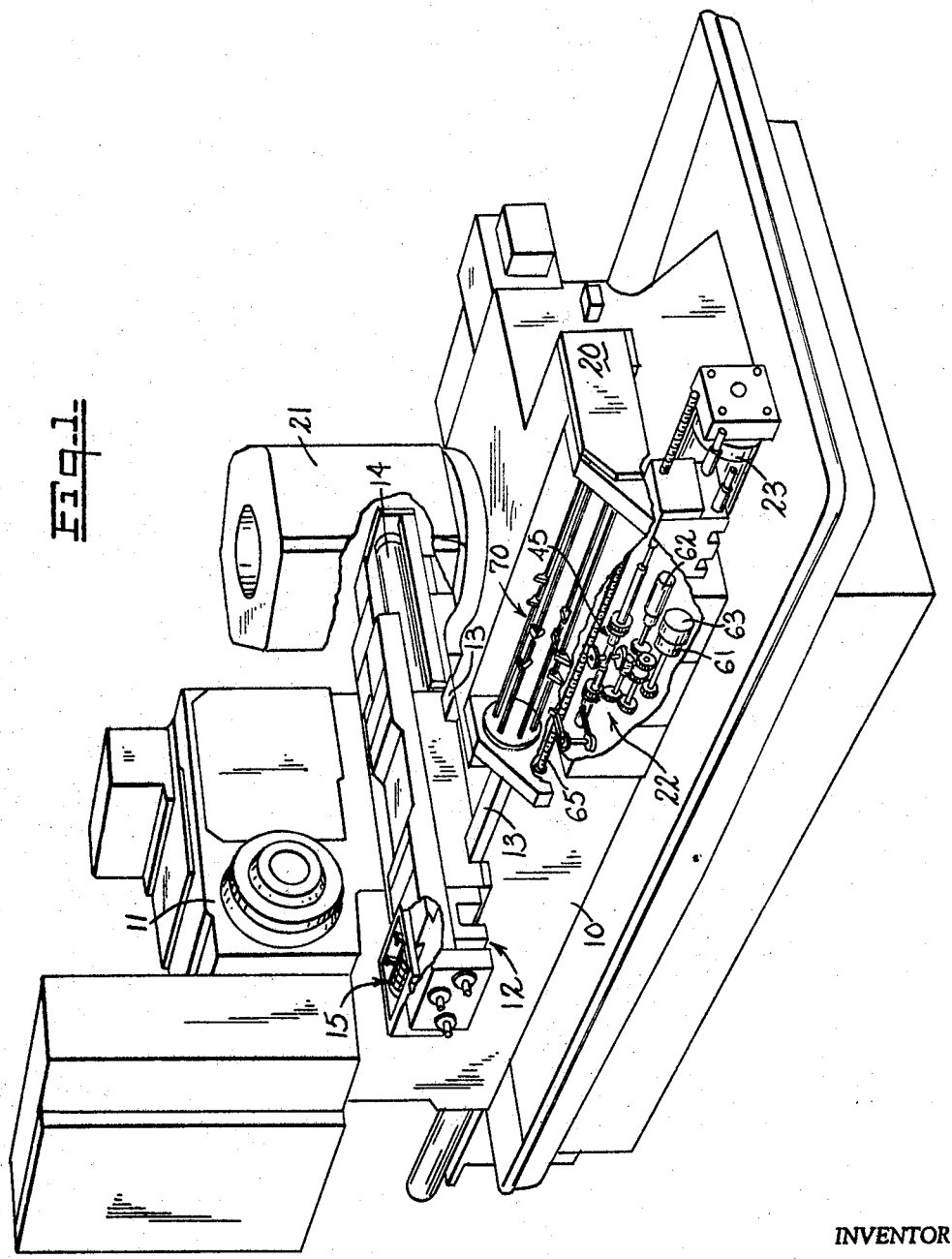

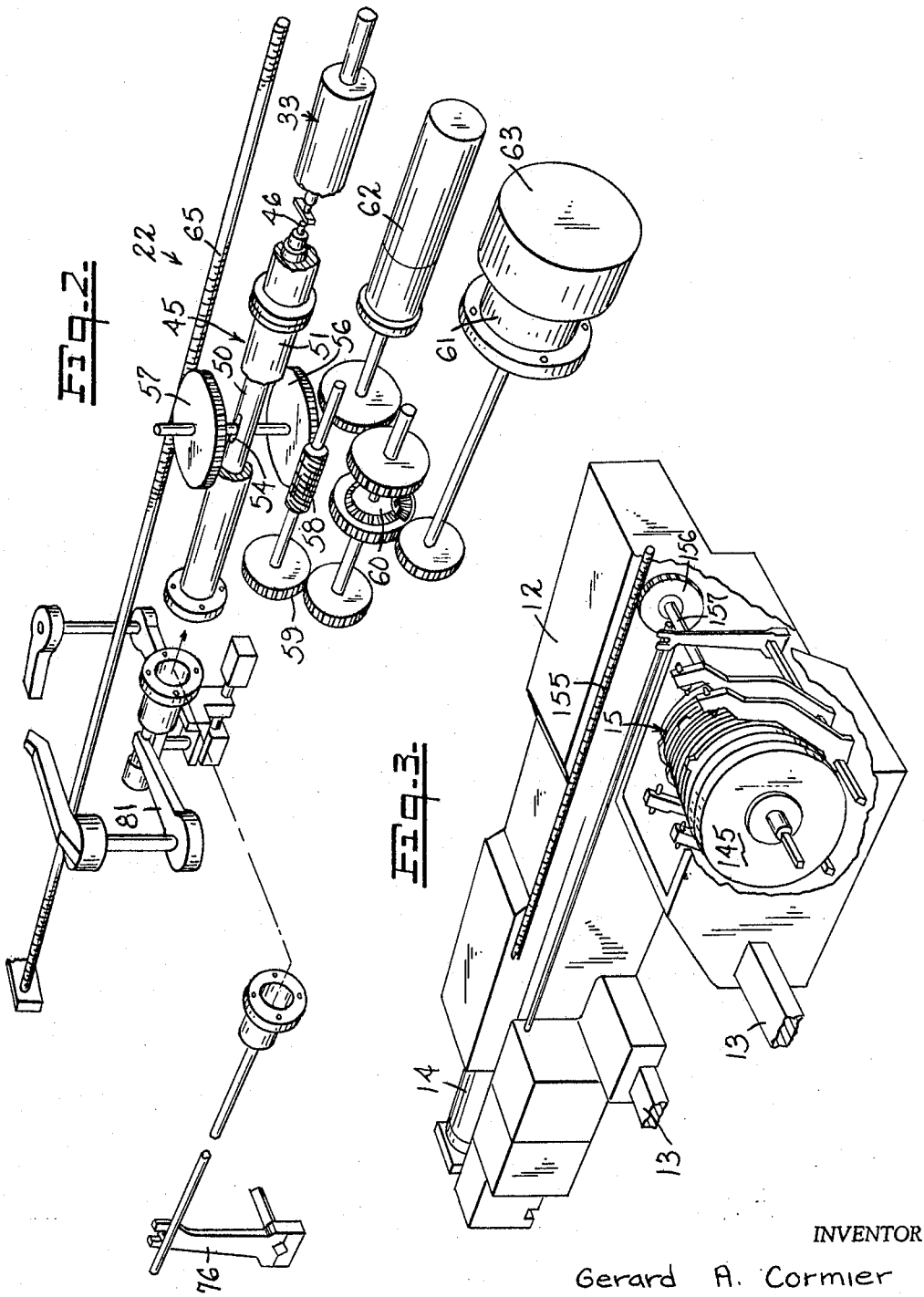

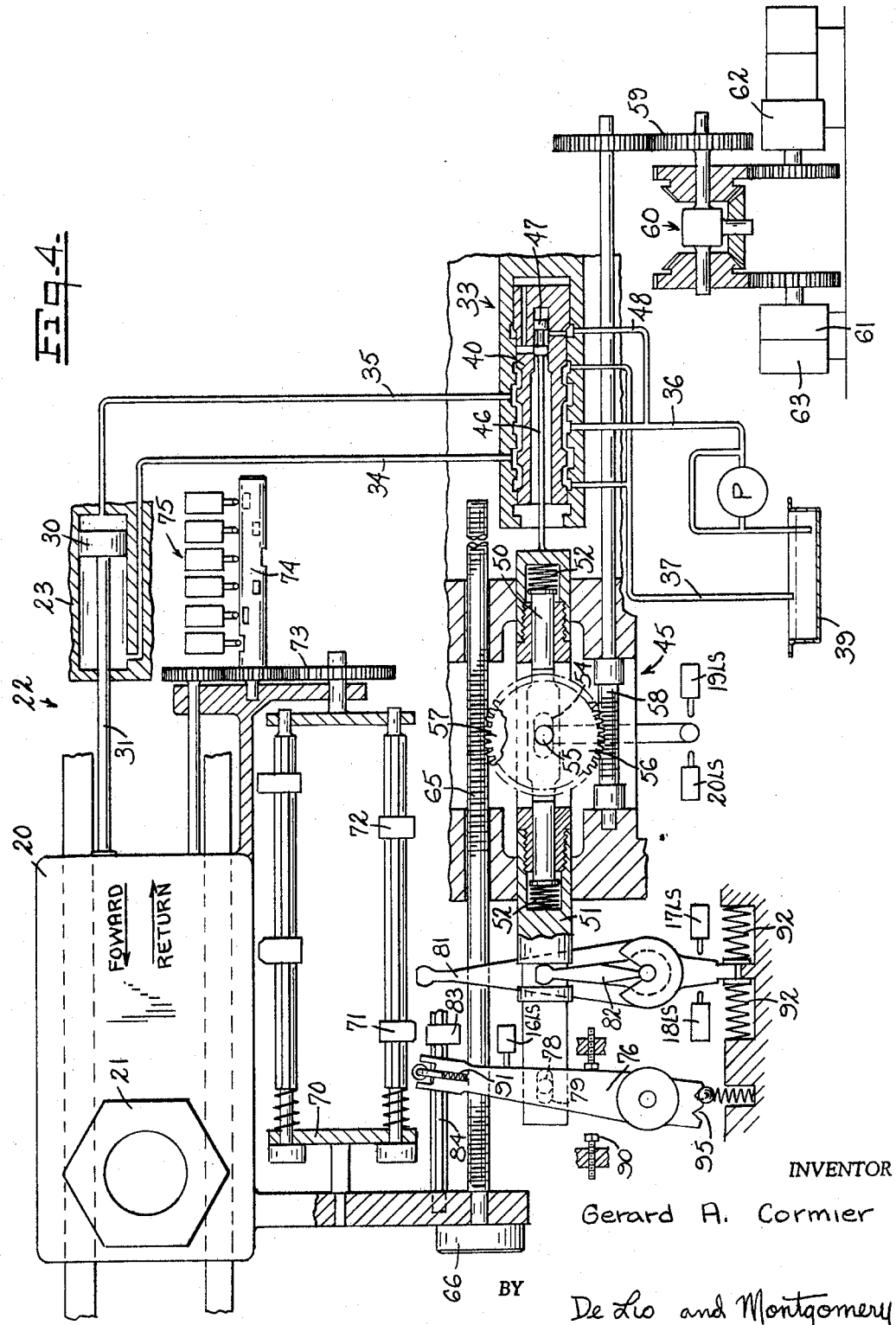

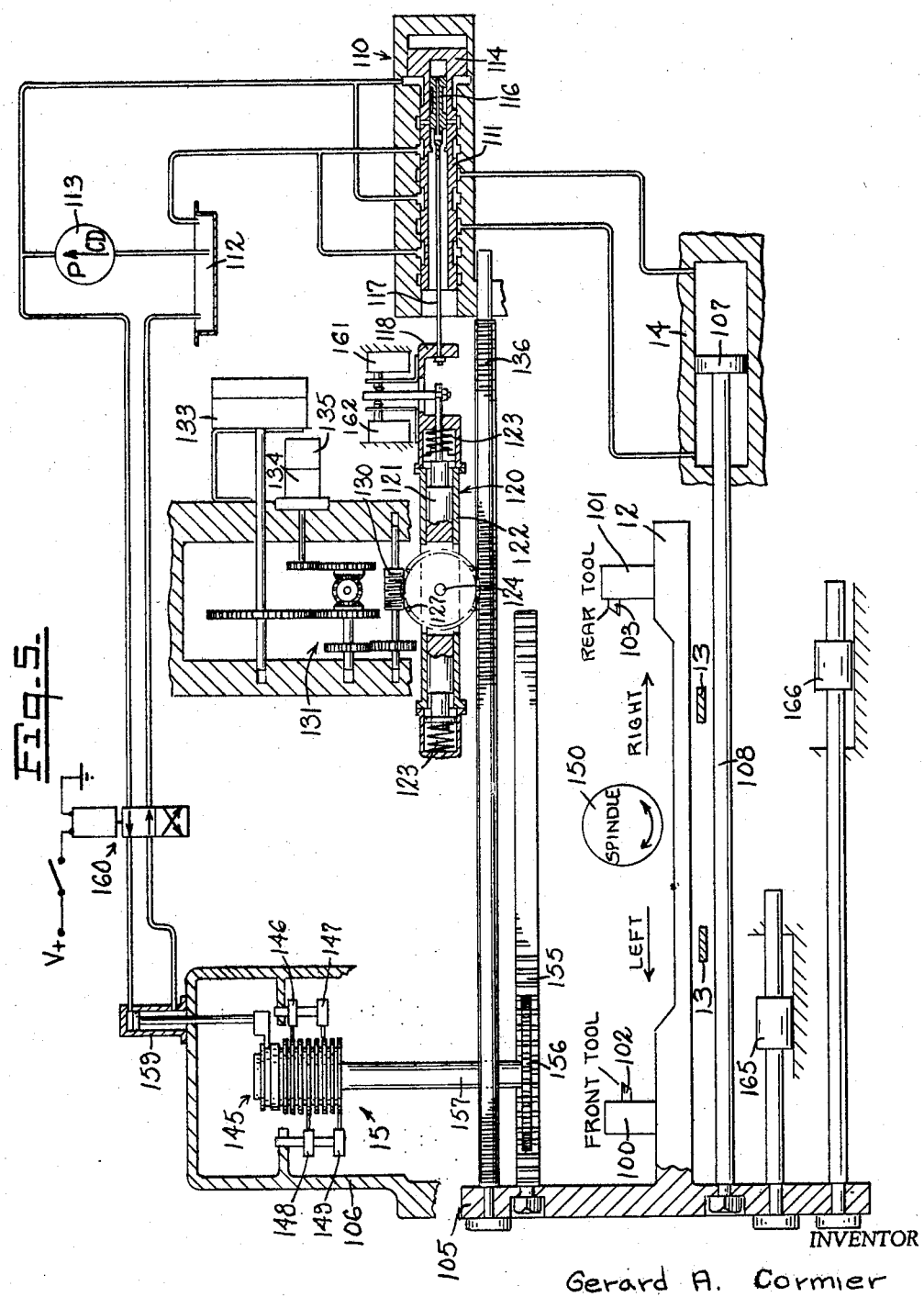

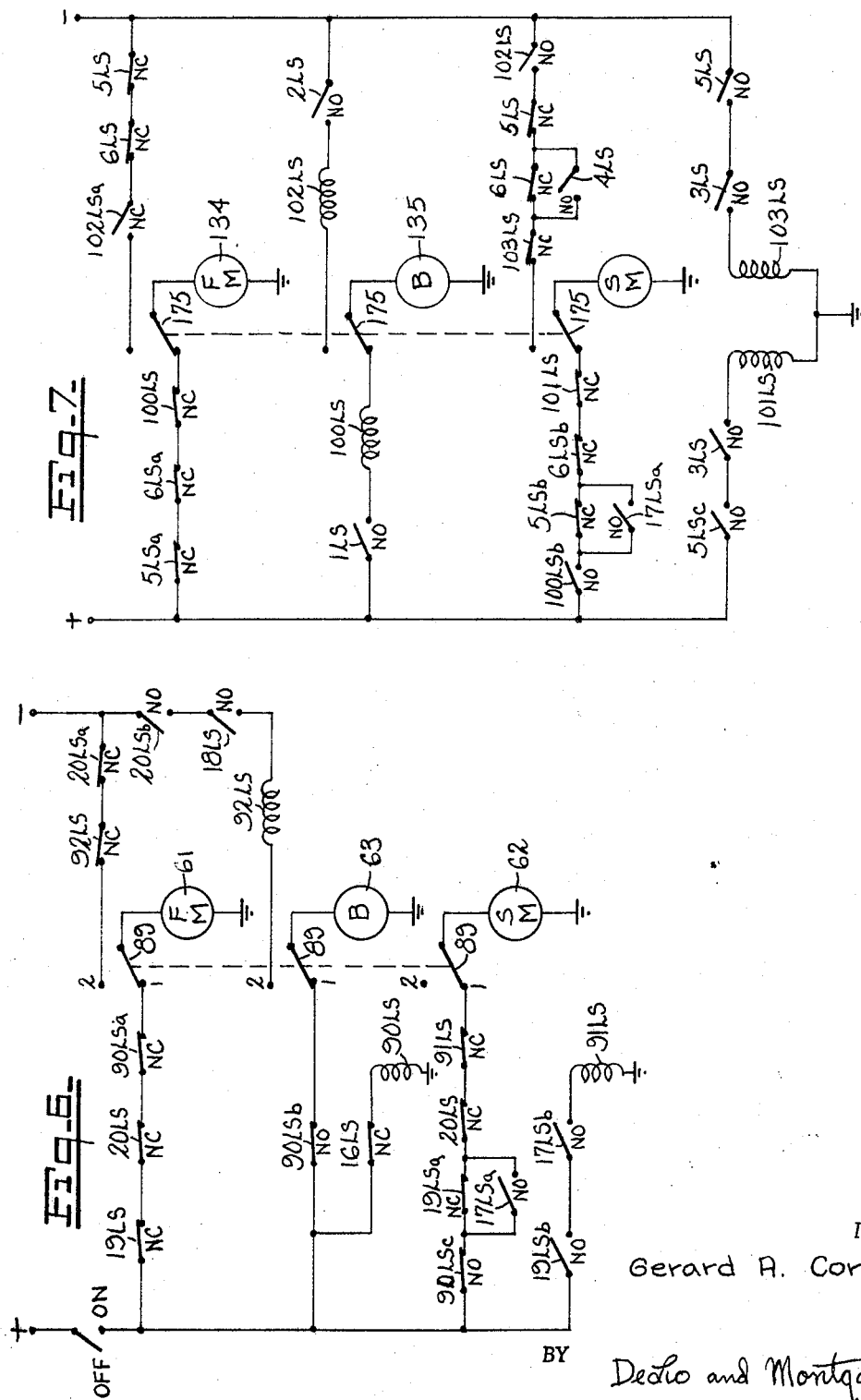

3,481,231
MACHINE TOOL CONTROL SYSTEM
Gerard A. Cormier, Springfield, Vt., assignor to Textron
Inc., Providence, R.I.
Filed Jan. 23, 1967, Ser. No. 610,993
Int. Cl. B23b 21/00; F15b 13/16, 15/18
U.S. Cl. 82—21                                    7 Claims

ABSTRACT OF THE DISCLOSURE

A machine tool control system for controlling the movement of a tool supporting means as it advances toward and moves away from a workpiece. Feedback means are provided as a part of the control system for controlling the movement of the tool supporting means during both rapid traverse and slow feed of a tool toward the workpiece.

---

This invention relates to control systems for use in machine tools and more particularly to control systems which may be used to control the movement of the saddle and cross slide of a turret lathe.

In prior art turret lathes having a headstock for holding a workpiece, a saddle and a cross slide for supporting means for holding tools, the saddle or cross slide is first rapidly moved from a distant position into close proximity to the workpiece and is then slowly fed toward the workpiece as the tool operates on the workpiece.

In the past, the movement of the saddle or cross slide was not controlled by velocity or position feedback signals during its rapid movement toward the workpiece, but was controlled only during the slow feed of the tool toward the workpiece. This resulted in the large mass of the saddle or cross slide jerking while attempting to slow down from rapid traverse to slower speed. Furthermore, the prior art open loop no feedback systems require an excessive amount of time for the saddle or cross slide to slow down prior to entering the feed phase of the operation.

To alleviate the difficulties encountered by the prior art systems, applicant has provided a new and improved system which controls the saddle or cross slide during both rapid and slow motions. This invention also provides means for obtaining continuous velocity and position feedback signals to control the rapid movement of the saddle or cross slide and to initiate the transition from rapid to slow feed traverse speeds.

It is therefore the principal object of this invention to provide new and improved means for controlling the advance of a tool carrying means toward a workpiece.

Another object of this invention is to provide new and improved means for controlling the rapid traverse of a saddle or cross slide toward a workpiece held in the headstock of a turret lathe.

A further object of the invention is to provide new and improved means for providing velocity and position feedback signals to control the rapid traverse of a tool carrying means toward a workpiece and subsequently initiate the transition from rapid to slow feed traverse speeds.

Still other objects and advantages of this invention will in part be apparent and will in part appear from the specification.

In general, first means are provided to rapidly and then slowly move a tool carrying means toward a workpiece, and second means responsive to movement of the tool carrying means are provided to continuously monitor and control the movement of the tool carrying means as said tool carrying means moves toward a workpiece. In the preferred embodiment according to this invention, this is accomplished by the provision of means coupled to the tool carrying means and acting in conjunction with means for moving a tool carrying means to control the movement of the tool carrying means as it advances toward a workpiece.

The invention accordingly comprises the features of construction, combination of elements and arrangement of parts which will be exemplified in the construction hereinafter set forth and the scope of the invention will be indicated in the claims.

For a fuller understanding of the invention, reference is had to the following detailed description taken in connection with the accompanying drawings, in which FIG. 1 is an isometric view of a turret lathe according to this invention;

FIG. 2 is a diagrammatic perspective of the controls for moving the saddle of a turret lathe, according to this invention;

FIG. 3 is a cut-away perspective of the controls for moving a cross slide of a turret lathe, according to this invention;

FIG. 4 is a diagrammatic view of the control system for moving the saddle of a turret lathe according to the invention;

FIG. 5 is a diagrammatic view of the control system for moving the cross slide of a turret lathe according to the invention;

FIG. 6 is a schematic diagram illustrating a circuit suitable for controlling the motors of the control system of FIGS. 1, 2 and 4; and FIG. 7 is a schematic diagram illustrating a circuit suitable for controlling the motors of the control system of FIGS. 1 and 3.

In FIG. 1 there is shown a turret lathe having a frame 10 for supporting a headstock 11 which holds a workpiece. Positioned adjacent to the headstock 11 is a carriage and cross slide 12 for holding a tool in a tool holder supported on the cross slide. The cross slide is adapted to move along ways 13 parallel to the face of the headstock 11. At 14 there is shown a cylinder for moving the cross slide with respect to the carriage and at 15 there is shown a portion of the controls which control the movement of the cross slide with respect to the carriage. A saddle 20 is shown having an indexible turret 21 mounted thereon which is adapted to hold a plurality of tools about the faces thereof in order to operate on a workpiece held in the headstock 11. The saddle 20 is supported on the frame 10 and is movable along ways 13. There is shown at 22 a portion of the controls for positioning the saddle and the turret with respect to the headstock and at 23 there is shown a fluid-actuated cylinder, preferably hydraulically-actuated, mounted on frame 10 for positioning the saddle and the turret with respect to the headstock 11.

Referring now to FIGS. 2 and 4, there is shown the control system for moving the turret and saddle forward toward the headstock 11 and returning them to their starting position after the work has been machined. The saddle 20 may be moved in either the forward or return direction by hydraulic cylinder 23 having a piston 30 with a rod 31 which is coupled to the saddle 20. Fluid is forced into the cylinder 23 through a two-stage servo valve 33 which has outlet tubes 34 and 35 coupled to the hydraulic cylinder 23 and input connections shown at 36 and 37. The fluid is pumped from a reservoir 39 into the valve 33 which has a cylinder portion 40 movable therein to couple the inlet and outlet tubings 34–37, such that the saddle will be forced by the piston 30 in either of two directions. The cylinder portion 40 is responsive to the movement of a differential carrier shown at 45, which has a portion thereof coupled to rod 46 of the valve 33. The rod 46 carries a spool 47 for permitting fluid to be forced into the valve through the tubular input means shown at 48, in order to move the cylinder portion 40 in either of two directions.

The differential carrier 45 comprises an inner sleeve 50 movable within an outer sleeve 51 which is itself movable within its support. A pair of springs 52 is provided to resist axial motion between the two sleeves. Formed within the inner sleeve 50 is a slot 54 in which a sliding round bar 55 is positioned. A pair of worm gears 56 and 57 is positioned on the bar 55. The gear 56 is driven by an input screw 58 through a gear train 59 and a differential gear train shown at 60 by two motors shown at 61 and 62, respectively.

The motor 61 produces a fast speed for moving the saddle at a rapid rate until it comes into proximity with the workpiece or during return of the saddle to its original position. The motor 62 is a slow feed motor which takes over the feeding of a tool toward the workpiece held within the headstock as the saddle approaches the workpiece. A brake 63 is provided on motor 61, the function of which is to slow down this motor as motor 62 commences feeding the tool held by the turret toward the workpiece. The other worm gear 57 is rotated by a screw called the feedback rod shown at 65. The rod 65 is attached to the saddle and provides a rack-type drive to the worm gear 57 from the saddle. The rod 65 is also manually adjustable by rotation of the knob shown at 66. The action of the screw 58 and the feedback rod 65 determines the speed at which the saddle will move toward the headstock holding the workpiece.

To control the operation of motors 61 and 62, there is provided from the saddle a reel 70 which supports dogs shown at 71 and 72. The reel 70 comprises a plurality of rods for supporting the dogs, as shown. The number of rods on the reel corresponds to the number of turret positions. In this case, i.e. a hexagonal turret, there are six rods on the reel. The reel is positioned in correct orientation by the action of a gear train 73 which is actuated in response to the indexing of the turret 21 in a well known manner. The indexing of the turret 21 turns a bar 74 which has a plurality of slots for selecting the correct switch of the six switches shown at 75, for setting the speeds of the fast and slow motors and the controls of the system, as well known in the prior art. The dog 71 is positioned on reel 70 to coact with a lever shown at 76 which, in turn, is connected through a pin 78 through differential carrier 45, by a slot 79 formed therein. As the saddle moves forward, the lever 76 will pivot to cause a switch 16LS to react thereto, to cause motor 61 to be braked and de-energized simultaneously and to start the slow feed motor 62.

A second ganged group of levers is shown at 81 and 82. The lever 81 is operated by either of two dogs, one of which is shown at 72, and the other at 83 which is coupled to a bar 84 mounted on the saddle. The dog 72 cooperates with lever 81 to initiate the stopping of the slow motor when the saddle is in a position at the end of the feed of the tool toward the workpiece. The dog 83 operates in the reverse direction, when the saddle has returned to its original starting position. The stopping of the slow motor is accomplished by engagement of limit switches shown at 17LS and 18LS. The movement of the servo valve 33 is accomplished by the action of lever 82 against the outer sleeve of differential carrier 45, causing valve 33 to operate to stop the system.

As shown in FIG. 4, two more limit switches 19LS and 20LS are also provided. These switches act in conjunction with the shaft holding gears 56 and 57 to stop the slow speed motor in the event of the breaking of a tool, such as a drill, part way through its cycle. When the relative motion between the two sleeves 50 and 51 exceeds the limit switch clearance defined by switches 19LS and 20LS an electrical indication is obtained that states that the velocity of the shaft 65 is substantially unequal to the velocity of shaft 58. This condition would arise if a drill were to break part way through its cycle and stall the saddle. Stopping the cycle here is important since a reamer or boring bar may be the next tool fed to the workpiece. If the cycle was permitted to continue, each succeeding tool would also be broken.

To more fully describe the operation of the control system shown in FIGS. 2 and 4, reference should now be had to FIGS. 2 and 4 in conjunction with FIG. 6 in which a schematic diagram illustrates the circuit for operating the motors according to the invention.

Assuming that the saddle is at the extreme right of FIG. 4 and that, initially, switch 16LS is held open, the selector switch 89 is on contact No. 1, the power is then turned on (On-Off switch) and the fast motor 61 begins to operate. The brake is off since it is de-energized. In the drawings, the term "NC" means "normally closed" switch, and "NO" means "normally open" switch. The operation of motor 61 causes the servo valve to be displaced by the action of input screw 58 against the worm gear 56. This causes fluid to flow into cylinder 23, such that the saddle commences to move in the forward direction. As the saddle moves to the left of FIG. 4, the dog 71 engages lever 76, which permits switch 16LS to close and cut off power to fast motor 61, applies power to brake 63 to brake the fast motor 61 and, simultaneously, start slow motor 62. This is accomplished by the switch 16LS energizing a coil 90LS which in turn opens normally closed contact 90LSa and closes normally open contact 90LSb.

The lever 76 also begins to engage the differential carrier 45 by way of pin 78 acting against slot 79. This causes the differential carrier to stroke the servo valve to a position equal to the maximum feed rate. This occurs when lever 76 hits the stop shown at 90. The spring mechanism shown at 91 provided in lever 76 permits the dog 71 to continue on beyond the transition point. When the position of the saddle has completed the shifting of the servo valve to maximum feed position, the fast motion input motor is still being braked to a stop. The difference in rate of deceleration between the saddle and the input causes inner sleeve 50 to move relative to outer sleeve 51. The saddle will continue on at maximum feed rate for a distance equal to the relative motion between the sleeves. This distance of the saddle must be multiplied by the ratio equal to the lever ratio. When this motion has been taken out, the saddle will continue at a feed rate determined by the speed of motor 62 which in turn has been preset at the program console of the turret lathe.

As may be seen, as the saddle moves toward the left of FIG. 4, the feedback rod 65 will be pulled along with the saddle so as to provide an indication of the velocity of the saddle. The feedback system is said to be in a satisfied condition when the output velocity of feedback rod 65 is equal to the velocity of input screw 58. Under these conditions the servo valve and differential carrier have been displaced an amount which permits the hydraulic fluid flow to the cylinder 23 to maintain the saddle velocity equal to the input velocity. If these velocities differ, a displacement of differential carrier 45 and the valve 33 will occur in a direction to reduce such difference. A new position of the servo valve will result in a reduced difference. This correction will continue until the output velocity is equal to the input. The system levels off in a stable equilibrium position or null at this point. When the input signal is stopped, that is, the input through input 58, the differential carrier 45 and valve 33 assume a position at which the pressure of cylinder 23 produces forces acting on piston 30 that are equal and opposite since, if the force available to move the saddle is zero in any one direction, the saddle is stopped or at zero velocity. Thus, a feedback signal is continually applied as the saddle moves in the fast forward direction.

When the slow motor takes over, the feedback signals will be continuously provided by movement of the feedback rod 65. As the saddle continues to move to the left of FIG. 4, in the forward direction and begins to move close to its end point, the dog 72 on reel 70 engages the end point lever 81. This lever is spring-centered by springs shown at 92. The lever 81 moves in a direction to engage limit switch 17LS to provide an electrical indication which may be shown by an indicator (not shown), that the saddle has almost reached the end point. The engagement of switch 17LS closes its contacts 17LSa and 17LSb. As the carrier continues to move to the right of FIG. 4, in a direction opposite to that of the saddle, the limit switch 19LSa is opened and 19LSb is closed, thereby energizing coil 91LS to open contact 91LS and thus stop the slow motor.

To return the saddle 20 to the right of FIG. 4, its return position, the selector switch 89 is moved from contact 1 to contact 2 and the fast motor 61 begins to operate in the reverse direction. The initial burst of speed from the fast motor input displaces the inner sleeve back toward its normal position and the valve is then displaced an amount sufficient to provide fast motion to the cylinder at a velocity equal to the input. Fast motion input for return will displace the valve to the left and the returning saddle and reel dog 72 will allow the spring loaded portion of lever 81 to center. At the start of the return, the fast motion to feed lever 76 is held by detents shown at 95. The stroking of the valve to the left is not hampered by this lever because of the backlash provided between the valve and the lever. At this time the saddle is returning and is about at the point of its forward fast motion feed, the fast motion to feed dog 71 will reset the fast motion to feed lever 76 to the right-hand position. It will be held there by a detent until the next cycle. The lever 76 motions do not disturb the hard over position of the servo valve which is causing the rapid return of the saddle. When the saddle has returned a sufficient distance, the home dog 83 engages the other side of the end point lever 81 and this action centers the valve 33 and closes switch 18LS. As the saddle continues to move, the limit switch 20LSa is opened and 20LSb is closed, causing the brake 63 to be energized and simultaneously energizing coil 92LS which opens contact 92LS to de-energize the motor.

This completes a description of the operation of the control system used to operate the saddle portion of the turret lathe according to this invention.

Referring now to FIGS. 1, 3, 5 and 7, there is shown the cross slide 12 mounted on the ways 13. The slide 12 is movable parallel to the face of the headstock 11 by the action of a cylinder 14 which operates under the control of the control system shown generally at 15. More particularly, the cross slide 12 includes two tool holding means shown at 100 and 101 for holding tools shown at 102 and 103, respectively. The cross slide 12 is attached to a face plate 105 and is slidably mounted on a member 106. The member 106 is mounted directly on the ways 13 such that the cross slide 12 may be moved inwardly or outwardly toward the face of the headstock 11. The cylinder 14 for moving the cross slide 12 includes a piston 107 having a rod 108 attached to the face member 105. By forcing fluid into the cylinder, the cross slide is moved to either the left or right of FIG. 5 so as to position the tools 102 and 103 in contact with the workpiece.

To provide fluid to control the piston 107, there is provided a two-stage servo valve 110 which is comparable to the servo valve described in conjunction with FIG. 4. The servo valve 110 includes an outer sleeve portion 111 for controlling the flow of fluid into the cylinder 14 from a source 112, and a pump 113. The sleeve 111 includes a piston 114 which moves to the left or right of FIG. 5 in accordance with the position of a spool as shown at 116. The spool 116 is coupled to a rod 117 through a member 118 forming a part of a differential carrier mechanism 120, of the same type as shown in FIG. 4.

The differential carrier 120 comprises an inner sleeve shown at 121 and an outer sleeve shown at 122. The inner sleeve 121 is slidable within the outer sleeve 122 and is resiliently biased within sleeve 122 by springs 123. Carried by the inner sleeve 121 in a slot formed therein is a shaft 124 having mounted thereon two gears, one of which is shown at 127. The arrangement of these gears is as shown in FIG. 2. The gear 127 engages a screw 130 which is driven by a universal gear mechanism shown at 131 by either of two motors shown at 133 and 134, respectively. The motor 133 operates at a slow speed, whereas motor 134 operates at a fair speed. There is also provided a brake shown at 135 for stopping the fast motor 134 after the motor 133 is energized during the feeding of a tool toward the workpiece. Attached to the cross slide is a feedback rod screw 136 which engages gear 127 so as to provide an indication of the position and velocity of the cross slide relative to the input screw 130. The operation of the input screw, the feedback screw and the differential carrier, as well as the two-stage servo valve 110 and the cylinder 114, is the same as described with reference to the saddle.

In order to control the operation of motors 133 and 134, there is provided a cam drum 145 having a plurality of cam cut-outs to actuate switches shown at 146, 147, 148 and 149. The switch 147 controls the transition of the motors from fast to slow speeds as the front tool 102 moves toward the workpiece held in a spindle shown at 150. On the other hand, the switch 146 indicates the anticipated end point, which then indicates to the operator that the end point is approaching. The switches 148 and 149 accomplish the same when the rear tool 103 is being moved toward the workpiece held in the spindle 150. As the cross slide moves, the drum 145 is driven by the provision of a rack 155 which drives a gear 156 and a shaft 157 coupled to the drum 145. The cams may be positioned to alter the time of actuation of switches 146 and 147, by the provision of a hydraulically-actuated cylinder 159 controlled by a solenoid valve shown at 160 and its associated electrical circuitry.

In order to stop the movement of the front or rear tool 102 or 103, respectively, there is provided as shown at 161 and 162 switches which indicate that the tools have reached their end points. These switches also provide an indication of velocity error as a result of the difference in velocity of the input screw and the feedback rod.

Also as shown in the drawing, there are provided front and rear tool adjustable positive stops 165 and 166, respectively, which may be manually adjusted by the turning of the knobs associated with these stops.

To more fully explain the operation of the cross slide, reference should be had more particularly now to FIG. 7 in conjunction with FIG. 5. In FIG. 7 there is shown the control circuitry for operating the cross slide of FIG. 5. It should be understood that modification of this circuitry could be made, if desired, by one skilled in the art. If it is initially assumed that the cross slide is in the center position and it is desired that the rear tool 103 be moved to the left, the power is then turned on and the switch shown at 175 is moved to the "1" contact position. Thus, the fast motor 134 is started and the cross slide will begin moving to the left at a rapid rate. During this time, the drum 145 is turning and continues to turn until the switch 1LS is actuated. At this time the switch 1LS closes and energizes a coil shown at 100LS and de-energizes the fast motor 134, simultaneously energizing brake 135. At the same time, the coil 100LS closes a contact 100LSb in the path of the slow motor 133 and causes the slow motor to commence operating and the tool 103 to be fed toward the workpiece held in the spindle 150. After a period of time, the switch 3LS is closed to indicate that the tool 103 is approaching its end point position. As the tool continues to feed on the workpiece, eventually the switch 5LSc closes, to energize a coil shown at 101LS which, in turn, opens a contact 101LS in the circuit of the slow motor 133. At this time, the motor 133 will become de-energized.

In order to drive the tool 102 to the right, the switch 175 is moved to the "2" contact position and the power is applied to reverse the direction of rotation of the fast motor 134. As before, the slide will move to the right and eventually the switch 2LS will close, energizing the coil 102LS, and opening the contact 102LSa, thereby de-energizing the fast motor 134. Additionally, the closing of the switch 2LS energizes the brake 135 to assist in stopping the motor 134. At the same time, contact 102LSb closes to energize the slow motor 133. Eventually, contacts 3LS and 5LS close to energize coil 103LS, and open contact 103LS, thus de-energizing the slow motor 133 and thereby stopping the cross slide.

This completes the description of the preferred embodiments of the invention.

It will thus be seen that the objects set forth above, among those made apparent from the preceding description, are efficiently attained and since certain changes may be made in the foregoing constructions without departing from the spirit and scope of the invention, it is intended that all matter contained in the above description or shown in the accompanying drawing, shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:

1. In a machine tool for moving a first member toward a second member at a controlled rate including a fluid pressure actuated cylinder and piston for moving the first member, a source of fluid pressure, a two-way valve having a flow control member for conveying fluid from said source to said cylinder; a carrier member, a traverse drive and a feed drive, a drive shaft, means coupling said drives to said drive shaft, means connecting said drive shaft to said carrier member to urge movement of said carrier member upon rotation of said drive shaft, means coupling said first member to said carrier member to urge movement of said carrier member in a direction opposite to said drive shaft upon movement of said first member, a valve-actuating member supporting said carrier member for yielding movement therewith, means acting between said valve-actuating member and said carrier member for restoring and maintaining said valve-actuating member in a predetermined position with respect to said carrier member, means connecting said valve-actuating member to said flow control member, and means responsive to approach of said first member toward said second member for de-energizing said traverse drive and energizing said feed drive.

2. The invention of claim 1 wherein said carrier means comprises a rod-like member having a shaft extending laterally therethrough, first and second gears mounted to said shaft and adapted to be urged in opposite directions by said drive shaft and said means coupling said first member to said carrier member.

3. The invention of claim 2 wherein said valve-actuating member is in the form of a sleeve and receives said rod-like member therein, and resilient biasing means normally positioning said rod-like member in said valve-actuating member.

4. The invention of claim 2 wherein said drive shaft comprises a screw shaft meshing with one of said gears and said means acting between said valve-actuating member and said carrier comprises a screw shaft acting on the other of said gears.

5. The invention of claim 1 further including a differential connecting said drives to said drive shaft.

6. The invention of claim 1 further including means responsive to said approach of said first member for positioning said valve-actuating member to produce a predetermined feed of said first member.

7. The invention of claim 1 further including means for sensing relative motion between said valve-actuating member and said carrier member above a predetermined magnitude and interrupting operation of said drive means.

References Cited
UNITED STATES PATENTS

| | | | |
|---|---|---|---|
| 2,601,157 | 6/1952 | Le Lan | 82—21.1 |
| 2,731,869 | 1/1956 | Breza et al. | 82—21.1 |
| 3,103,148 | 9/1963 | Le Brusque | 82—21.1 |

LEONIDAS VLACHOS, Primary Examiner

U.S. Cl. X.R.

60—52; 91—364